Jan. 10, 1939. A. B. KENNEDY 2,143,156
CONTAINER FOR DISPENSING LIQUIDS
Filed Dec. 30, 1936
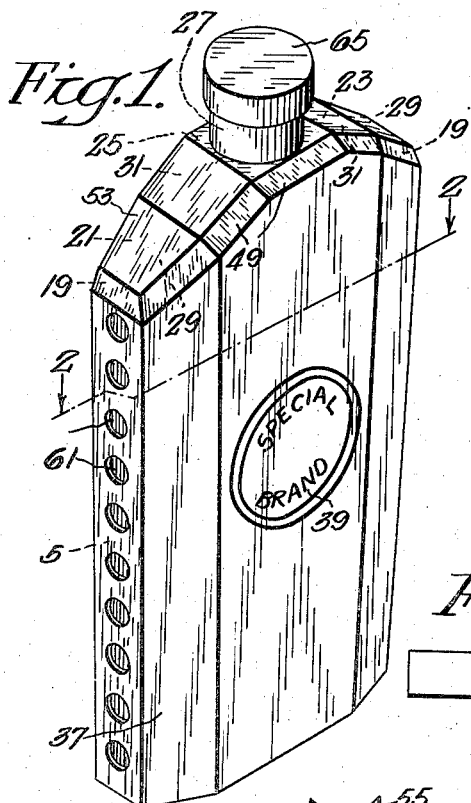
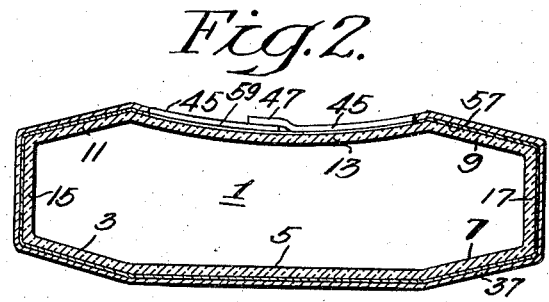
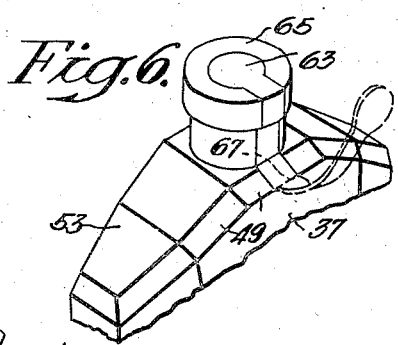
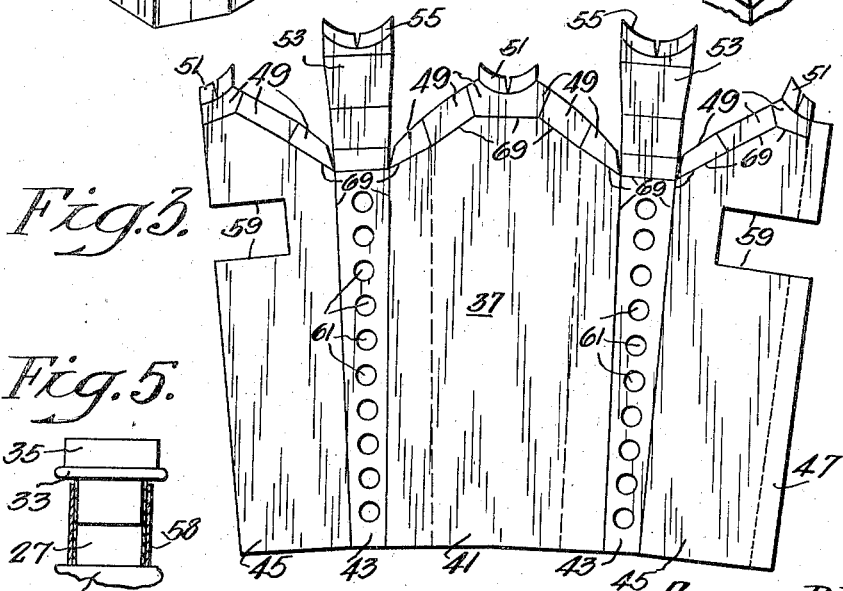
Inventor
Angus B. Kennedy
By Morrish Rabkin
Attorney

UNITED STATES PATENT OFFICE 2,143,156

CONTAINER FOR DISPENSING LIQUIDS

Angus B. Kennedy, Hanover, Pa.

Application December 30, 1936, Serial No. 118,251

4 Claims. (Cl. 215—12)

This invention relates to containers for dispensing liquids, and more particularly to a container of one material which is made to simulate the appearance of having been made of another, and preferably more expensive, material.

It is well recognized that there are many liquids which can best be dispensed on the market in containers made of certain materials. For example, most alcoholic beverages are packed for the market in glass bottles of various sizes and shapes, the shapes of the bottles being usually chosen with an eye to attractiveness. It is also well known that there are numerous metallic flasks on the market which are especially designed to contain alcoholic beverages, such flasks being provided not only for decorative purposes, but also for strength, and for this reason are to be preferred to glass bottles which are, of course, easily subject to breakage. However, metallic bottles or flasks frequently impart to the contents a metallic taste, thereby rendering it undesirable for consumption in many cases. Moreover, the cost of metal flasks is so great as compared to the cost of glass bottles that, despite their occasional preference, their use is economically prohibitive.

Various attempts have heretofore been made to provide glass bottles which have the appearance of having been made of metal. For example, in some cases, glass bottles have been wrapped with sheet metal foil material, but the attempted disguise is readily apparent. Again, it has been proposed to give glass bottles the appearance of metal by electro-depositing or otherwise applying the metal thereto in minute state, but such methods are all very expensive. It has also been proposed, heretofore, to attempt only a partial disguise of the glass bottle by applying thereto a metal foil label, or by placing the same in a metallic canister. All these, and other similar attempts, have been unsuccessful either because they are too costly, because they effect an incomplete and inadequate disguise, or for both reasons.

The primary object of my invention is to provide an improved bottle for beverages and other liquids which will not be subject to most of the objections found in conventional glass bottles.

More specifically, it is an object of my invention to provide an improved inexpensive glass bottle for alcoholic and other beverages which will simulate the appearance of an expensive metallic flask.

Another object of my invention is to provide an improved glass bottle for beverages which will be highly decorative in appearance and attractive to the eyes of prospective purchasers of the beverages.

Still another object of my invention is to provide an improved glass bottle as aforesaid which is reinforced in strength and the danger of breakage of which is reduced to a minimum.

A further object of my invention is to provide an improved glass bottle of the character set forth which, while simulating the appearance of having been made of an opaque material, will, nevertheless, afford ready means of ascertaining the nature of the contents as well as the level of the liquid remaining therein.

Still a further object of my invention is to provide an improved method of applying, in a facile manner, a metallic or other suitable covering to bottles of glass or the like.

Another object of my invention is to provide an improved beverage dispensing container which will neither itself deleteriously affect its contents nor permit the natural elements, such as sunlight, to do so.

Still another object of my invention is to provide an improved beverage dispensing container as aforesaid which is entirely tamper proof and which will, therefore, afford complete protection against changing, contaminating or otherwise in any way affecting the original contents thereof.

Also a very important object of my invention is to provide an improved liquid dispensing container of the type set forth which is economical in cost, which is appealing from an artistic standpoint, and which readily lends itself to the commercial requirements of economical quantity manufacture.

In accordance with my invention, I provide a covering of metal foil for a glass or similar bottle and bond the metal covering to the glass by means of a suitable adhesive. The foil may be of any suitable sheet metal from which are cut a number of blanks each of which, when applied to the bottle, will conform snugly to the entire shape thereof. The adhesive used to bond the metal foil to the glass may be of a nature such that, when dry, it will harden and provide a sort of protective casing for the glass to protect it against easy breakage, while the metal foil itself may be decoratively tinted or otherwise suitably finished, whereby to render it highly ornamental. Preferably, I employ a paper backed foil, since such foil can be easily embossed or imprinted in a manner to serve also as a label. I also provide the foil blank with a number of sight openings through which the contents of the container may be readily viewed, thus permitting a prospective purchaser not only to receive a visible impression of the nature of the liquid or beverage, but also to easily ascertain the amount of beverage present in the container. Finally, as a protective measure for purchasers, the foil blank may be provided with one or more tabs so arranged to extend over the stopper or cap of the container that it will act as a protective seal, and the contents of the bottle can only be reached or removed by first breaking this seal.

The novel features that I consider characteristic of my invention are set forth with particularity in the appended claims. The invention itself, however, both as to its organization and method of assembly, as well as additional objects and advantages thereof, will best be understood from the following description of a specific embodiment thereof, when read in connection with the accompanying drawing, in which:

Figure 1 is a perspective view of a bottle formed in accordance with my invention, Figure 2 is a sectional view thereof taken substantially on the line 2—2 of Figure 1, Figure 3 is a plan view of a blank formed out of sheet metal foil and particularly suited to fit the body of a bottle having the shape of the bottle shown in Figure 1, Figure 4 is a plan view of that portion of the blank which fits about the neck of the bottle, Figure 5 is a fragmentary view showing the manner in which the blank of Figure 4 may be applied to the bottle neck, and Figure 6 is a fragmentary view of a bottle formed in accordance with a modified form of my invention wherein a protective tab or seal is provided to insure the safety of the contents of the bottle.

Referring more specifically to the drawing, wherein similar reference characters designate corresponding parts throughout, I have shown, in Figures 1 and 2, a bottle 1 of glass or the like having a plurality of angularly related, plane surfaces 3, 5 and 7, a pair of plane, angularly related surfaces 9 and 11 joined by a somewhat curved surface 13, and a pair of oppositely disposed side walls 15 and 17 which, respectively, connect the surfaces 3 and 11 and the surfaces 7 and 9. The surfaces 3, 5 and 7 constitute the front wall of the bottle, while the surfaces 9, 11 and 13 constitute the back wall of the bottle, the surface 13 being slightly curved in order to impart to the bottle a shape which will conform to the body of one carrying the bottle in his pocket, for example.

The upper edges of the several walls of the bottle may be beveled off to provide the bevel edge 19, for example, and the space between the bottle walls is substantially closed by a pair of shoulders 21 and 23 which extend from a central portion 25 from which the neck 27 rises. The shoulders 21 may each be suitably shaped to add to the ornamental appearance of the bottle and are shown, merely by way of illustration, as comprising angularly related faces 29 and 31. Preferably, the neck 27 is formed adjacent its outer extremity with an annular rim or pouring lip 33 of well known form (Fig. 5) and the contents of the bottle may be shut off from the atmosphere by a suitable closure device, such as a cap member or stopper 35.

The bottle thus far described is more or less the conventional type of bottle used in dispensing many beverages, except, perhaps, for its particular contour. According to common practice, this bottle is usually made of glass or some other frangible material for reasons previously pointed out. In order to remove the objectionable features of such bottles also previously noted, I apply to the glass or similar bottle 1 a sheathing 37 of infrangible material, such as sheet metal foil. The foil 37 may be made of aluminum, for example, and may be decoratively finished, as by hammering, tinting, or the like. Preferably, the sheathing 37 is made of paper backed foil as developed in the metal foil industry, since this type of foil may be readily embossed or imprinted with suitable markings, such as a label 39, pertinent to the contents of the bottle.

The sheathing 37 may be cut out from a strip of sheet metal foil and may have the shape illustrated in Figure 3, the particular blank shown being formed to snugly fit the bottle 1 when applied thereto. For this purpose, the blank 37 is formed with a central portion 41 which is adapted to snugly fit and cover the front wall 3—5—7 of the bottle, a pair of adjoining intermediate portions 43 which are adapted to snugly fit and cover the side walls 15 and 17, and a pair of outer portions 45 which are adapted to overlap along the marginal portion 47, when united, and to snugly fit and cover the back wall 11—13—9 of the bottle 1. The sheathing blank 37 is also formed with a series of slitted tabs 49 which fit snugly over the bevelled edge 19, and with tab extensions 51 on certain of the tabs 49 which fit around the base of the neck 27, the tabs 49 slightly overlapping the shoulders 21—23 and the central shoulder portion 25. The intermediate blank portions 43 are formed with extensions 53 which are adapted to snugly fit over the shoulders 21—23 and the shoulder portion 25, including the overlapping edges of the tabs 49, and they terminate in tab extensions 55 which also fit around the base of the neck 27.

The foil blank 37, after being suitably embossed or imprinted to provide the label 39, is bonded to the bottle 1 by means of a suitable adhesive 57 (Fig. 2). The adhesive 57 is preferably one which will harden in situ and thereby not only form a hard backing for the sheathing 37 to impart to the whole bottle a greater reality of being made entirely of metal, but will also provide a hard casing for the glass bottle 1 and thereby greatly reduce the liability of breakage thereof. Examples of suitable adhesives are those known commercially as "Bakelite Cement", "Amberoid Cement" and "Glyptal Cement", the former being, perhaps, best suited for this particular purpose of the three named. However, any suitable bonding material may be employed, being applied to the inner surface of the foil blank just prior to application of the blank 37 to the bottle 1. The blank 37 may be applied to the bottle either manually or by automatic machinery of suitable construction, the blank being preferably placed face down upon a suitable supporting surface after which the bottle 1 is placed thereon with the surface 5 against the blank portion 41. The blank 37 is then wrapped tightly around the bottle and the marginal portion 47 lapped over as shown in Fig. 2, the tabs 49 are pressed over the bevelled edge 19 and onto the shoulders 21—23—25, the extensions 53 are applied onto the shoulders 21—23—25, and the tabs 51 and 55 finally applied to the base of the neck 27. Thereafter, a second blank strip 58, formed of the same material as the blank 37 and provided with the same adhesive 57, is wrapped tightly around the neck 27 between the central shoulder portion 25 and the lip 33, as clearly shown in Fig. 3, and the finished container put aside either in open air or in an oven maintained at suitable temperature until the adhesive has had an opportunity to set and become hard.

The outer portions 45 of the sheathing blank are preferably provided with aligned cut-outs 59. When the portions 45 are united, the cut-outs 59 cooperate to form a relatively large opening against the surface 13 through which a prospective purchaser may view the liquid contents of the container. To permit this, the bottle 1 must, of course, be made of transparent glass. The blank 37 may also be provided with a series of longitudinally spaced, relatively small openings 61 in one or both of the intermediate portions 43, the purpose of the openings 61 being to permit readily ascertaining the level of liquid remaining in the container. If desired, only the openings 61 may be provided, in which case the bottle 1 may be made of either transparent or translucent glass, since it is merely essential that the glass transmit light without necessarily permitting a clear view of the contents thereof.

In Fig. 6, I have shown a modified form of container which, in addition to having the advantages heretofore pointed out, has the additional advantage of providing a seal which insures against unauthorized opening of and tampering with the contents of the container. For this purpose, the sheathing blank 37 may be provided with an integral sealing tab 63 which is applied and sealed over the covering cap 65. Removal of the cap 65 will, of course, result in tearing off of the tab 63 and will indicate that the container has been tampered with. If desired, the tab 63 may be scored at 67 to weaken the connection thereof with the body of the blank 37 to such a point that, should an attempt be made to separate the tab 63 from the cap 65, the force necessary to do so will result in tearing off the tab 63, thus again indicating the container has been tampered with.

From the foregoing description, the many advantages of my invention will, no doubt, be readily apparent. In addition to those heretofore specified, it is obvious that a cheaper glass, or a glass containing minor defects, may be used according to my invention without detriment to the appearance of the finished container. Moreover, whereas ordinary flint glass of the type conventionally used for liquor bottles affords little or no protection to liquids which are affected by sunlight, for example, a container formed according to my invention will be entirely free from this objection and will prevent the contents from becoming discolored or otherwise deleteriously affected. It will also be readily apparent to those skilled in the art that, while I have shown and described but two modifications of my invention, I am fully aware that many other modifications thereof and changes therein are possible. For example, the blanks 37 and 58 may be formed in one piece instead of two separate pieces. Also, if desired, the blank 37 may be slightly creased along the lines 69 which overlie the meeting edges of the several faces of the bottle. This facilitates locating the bottle with respect to the blank 37, and since the central portion 41 of the blank is imperforate, the finished container will appear to be made entirely of metal, when viewed from the front, particularly since the lines 69 properly fit the aforementioned meeting edges. Since many other modifications are possible, I wish it to be understood that I do not limit myself to the construction and shape of bottle herein disclosed, but rather intend that my invention shall only be limited by the prior art and by the spirit of the appended claims.

I claim as my invention:

1. In combination, a container for fluids comprising a bottle provided with a neck, a cap member covering said neck, and a foil sheathing bonded to said bottle, said sheathing having an integral tab thereon extending at least in part over and sealed to said cap member.

2. In combination, a container for fluids comprising a glass bottle provided with a neck, a cap member covering said neck, and a sheathing of metallic foil bonded to said bottle for imparting thereto the appearance of a metallic flask, said sheathing having an integral tab thereon extending at least in part over and sealed to said cap member whereby said cap member can be removed only after first separating said tab therefrom.

3. A flask for dispensing beverages comprising a glass bottle and a sheathing bonded to said bottle solely by means of an adhesive, said sheathing conforming snugly to the shape of said bottle and comprising a metal foil backed by paper, said paper backing lying against the surface of said bottle and said metal foil imparting to said bottle the appearance of a metallic flask.

4. A flask according to claim 3 characterized in that said metal foil is constituted by aluminum.

ANGUS B. KENNEDY.